United States Patent [19]

Zimmerman et al.

[11] Patent Number: 4,630,472
[45] Date of Patent: Dec. 23, 1986

[54] SEAT BELT TESTING DEVICE

[75] Inventors: Karen A. Zimmerman, Allen Park; Randall L. Weston, Sterling Heights; Richard D. Thomas, Wixom, all of Mich.

[73] Assignee: Chrysler Motors Corporation, Highland Park, Mich.

[21] Appl. No.: 771,874

[22] Filed: Sep. 3, 1985

[51] Int. Cl.$^4$ ............................ G01L 5/00; G01N 3/26
[52] U.S. Cl. .................................... 73/161; 73/862.44; 73/862.54
[58] Field of Search ................... 73/9, 11, 161, 862.27, 73/862.44, 862.08, 862.51, 862.54, 432 V, 862, 12

[56] References Cited

U.S. PATENT DOCUMENTS 2,893,240  7/1959  Able ............................... 73/862.44 X
2,953,030  9/1960  Replogle et al. ................. 73/12 X

FOREIGN PATENT DOCUMENTS 2071267  9/1981  United Kingdom ............... 73/11

Primary Examiner—Charles A. Ruehl
Attorney, Agent, or Firm—Edward P. Barthel

[57] ABSTRACT

A test fixture operative to simulate seat belt assembly installations. An articulated arm assembly, comprising a primary arm and a secondary arm, has its primary arm lower end mounted by a dual pivot of a support base at the origin of X and Y axes of an X, Y and Z coordinate system. The anchor position of the seat belt retractor is adapted to be releasably fixed on the support base relative to the X and Y axes. The seat belt webbing pillar turning loop is pivotally and linearly adjustably supported on the secondary arm. A motorized load transducer, located on the primary arm, extracts the seat belt webbing from its stowed position on the retractor providing measurements of the forces required to perform this action. The test fixture allows various changes in vehicle seat belt system components to be measured thereby readily determining the optimum installation geometries for a seat belt system that is comfortable and easy to use.

4 Claims, 10 Drawing Figures

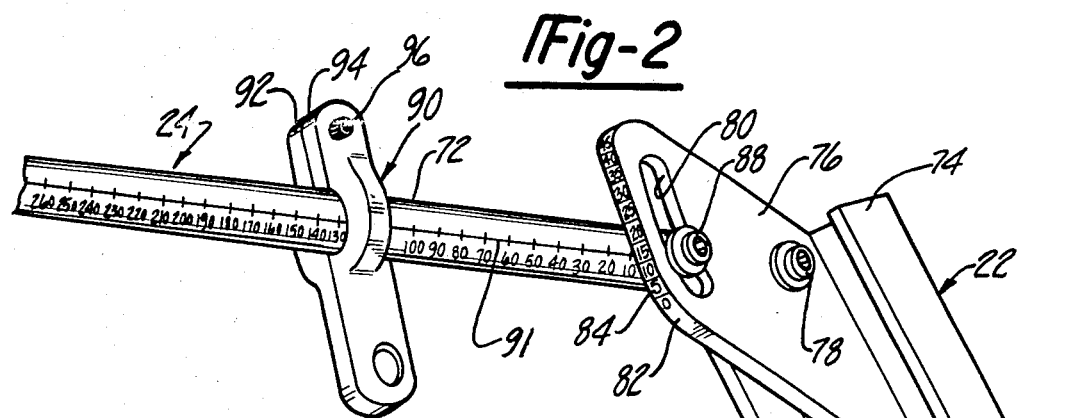
Fig-2
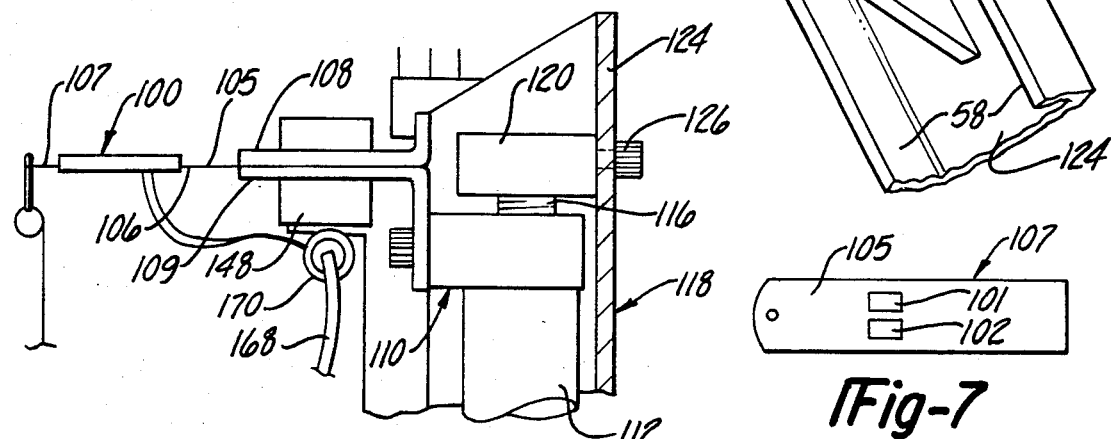
Fig-6
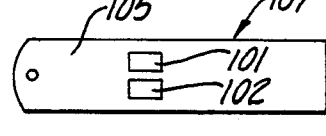
Fig-7
Fig-8
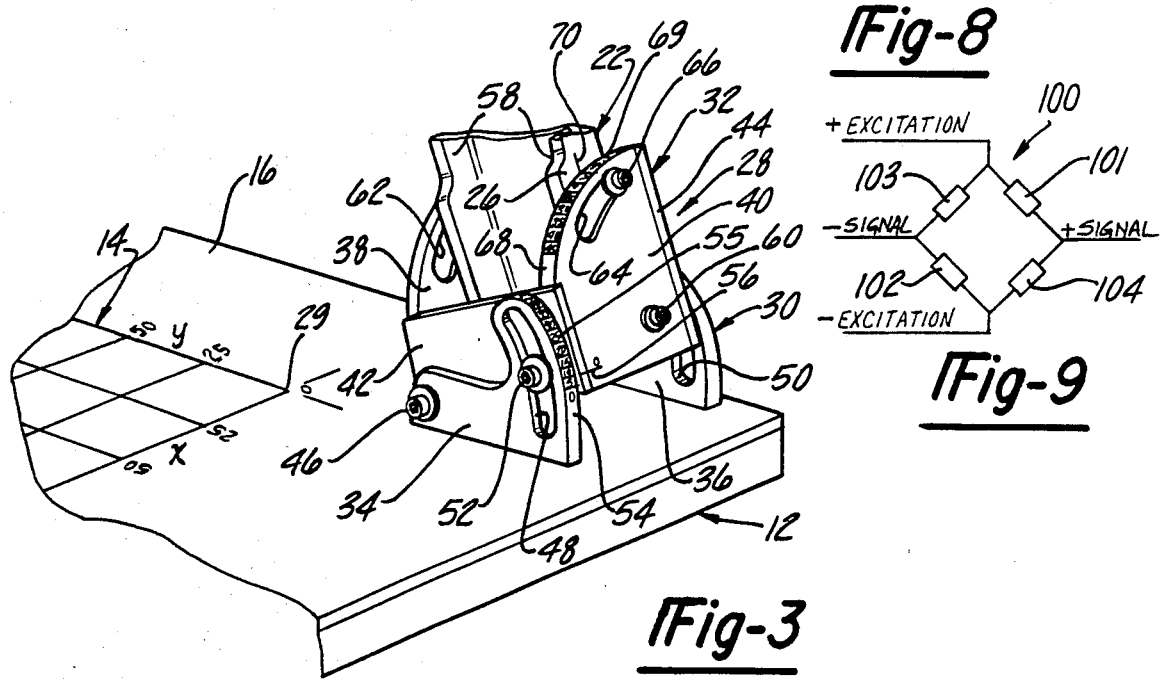
Fig-9
Fig-3

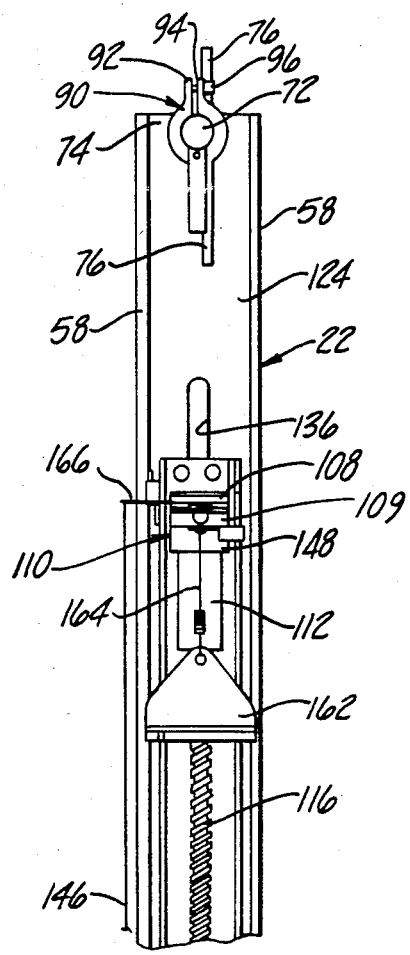
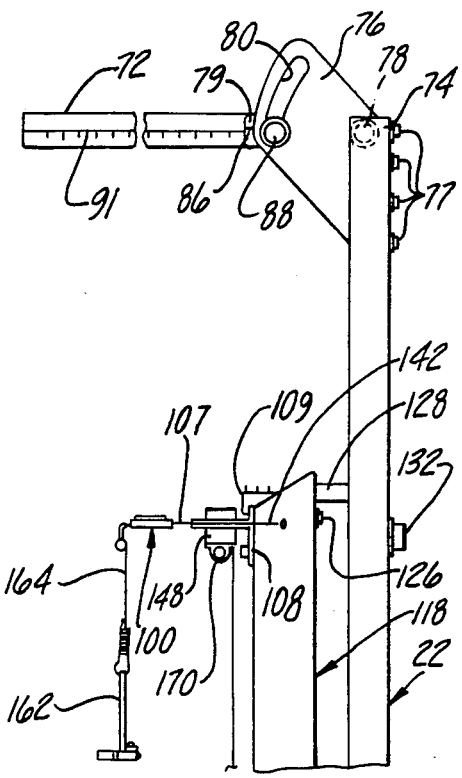
*Fig-4*
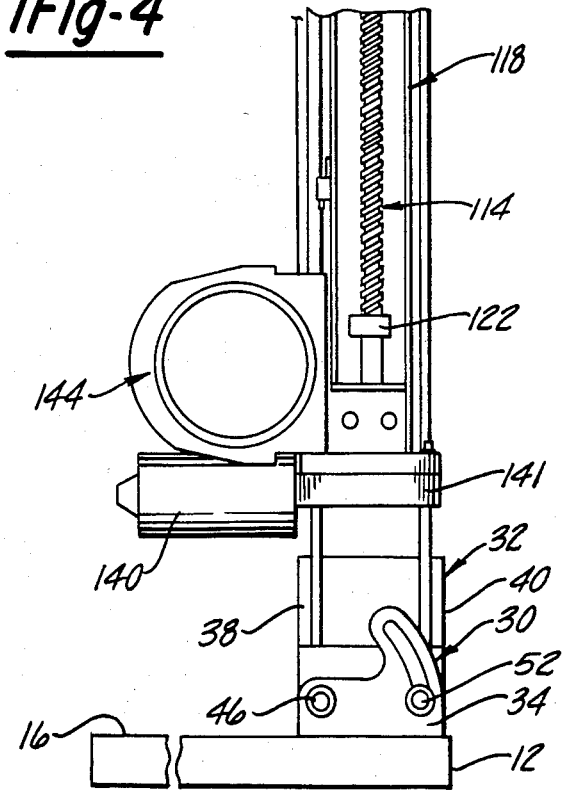
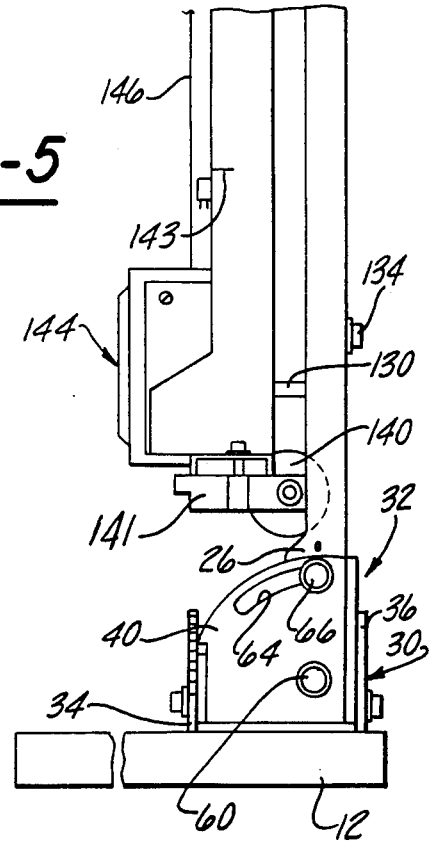
*Fig-5*

SEAT BELT TESTING DEVICE

BACKGROUND OF THE INVENTION

This invention, in general, concerns an apparatus for testing seat belts, and more particularly to a seat belt testing device for optimization of seat belt system components design and installation geometry.

Various testing equipment has been devised to secure objective data for wearing comfort design of seat belts. An example of one such device is described in SAE Paper No. 840398 entitled VW Restraint System Development—Design and Performance published in 1984 by W. Roseman and W. Schwant of Volkswagenwerk A.F. The VW paper discloses a bench test device that measures extraction and retraction force. The VW device, however, is not adjustable to account for vehicle geometry.

SUMMARY OF THE INVENTION

The comfort level of a seat belt system is most commonly characterized by the level of force that is felt at the user's chest, shoulder, and neck. A system that maximizes comfort will minimize the chest and shoulder forces, and will be positioned so that belt webbing contact with the user's neck is avoided whenever possible. The chest and shoulder forces are a function of the seat belt retractor spring characteristics and the positioning of the assembly in the vehicle.

The seat belt system characteristics that determine the chest and shoulder forces and, therefore, the level of the system's comfort and convenience of usage are the extraction and retraction forces resulting from the power spring selected for use on the retractor. The spring must be chosen so that the user's effort to extract the webbing is minimized, a direct consequence of a minimized retractor spring rate. In addition to achieving a minimized initial extraction effort, the shoulder and chest forces that the user feels when leaning forward (to adjust the heater, radio etc.) are also minimized. However, the spring rate must be great enough to accomplish full retraction and complete stowage of the latch plate and webbing when the system is not in use. Unfortunately, in a positive wind spring, an increase in the retraction force also increases the extraction force. It can be seen that these conflicting objectives, sufficient retraction but low extraction, must be balanced to achieve the described objectives.

It is therefore a feature of the present invention to isolate all the factors that affect a seat belt system's ability to retract and fully stow its latch plate and webbing. These factors are, for the most part, frictional ones. As the retractor spring rewinds, it must have sufficient output to lift the weight of the latch plate to its stowed position. In addition, this output must be increased by an amount that will also overcome the frictional sources that are working against this action. One major source of this friction is a result of pillar loop to webbing contact. By minimizing this frictional source, the spring output and its resulting retraction (and, therefore, extraction) force will be minimized.

It is another feature of the present invention to provide a seat belt test device that can be used to measure and record a seat belt system's extraction and retraction force while simulating an installed or proposed vehicle geometry. The present test device allows the opportunity to readily change one or all of the components of a system to quantify the effects of such a change.

Other objects and advantages of the present invention can be derived from the following detailed description when taken with the accompanying drawings.

BRIEF DESCRIPTION OF THE DRAWINGS

FIG. 2 is an enlarged, fragmentary perspective view of the secondary arm of the device;

FIG. 3 is an enlarged, fragmentary, perspective view of the primary arm's pivotal mounting with the base plate;

FIG. 4 is a front vertical elevational view of the primary arm showing its webbing drive mechanism;

FIG. 5 is a vertical side elevational view of the primary arm;

FIG. 6 is an enlarged fragmentary side elevational view with parts broken away of the transducer assembly;

FIG. 7 is an enlarged diagrammatic view of the upper surface of the cantilevered load transducer beam of FIG. 6 showing a first pair of strain gauges mounted thereon;

FIG. 8 is a view similar to FIG. 7 of the bottom surface of the cantilevered load transducer beam of FIG. 6 showing a second pair of strain gauges mounted thereon;

FIG. 9 is a schematic diagram of the bridge circuit utilized in the invention, and FIG. 10 is a schematic block diagram of the testing device of the present invention.

DETAILED DESCRIPTION OF THE INVENTION

Figure 1:
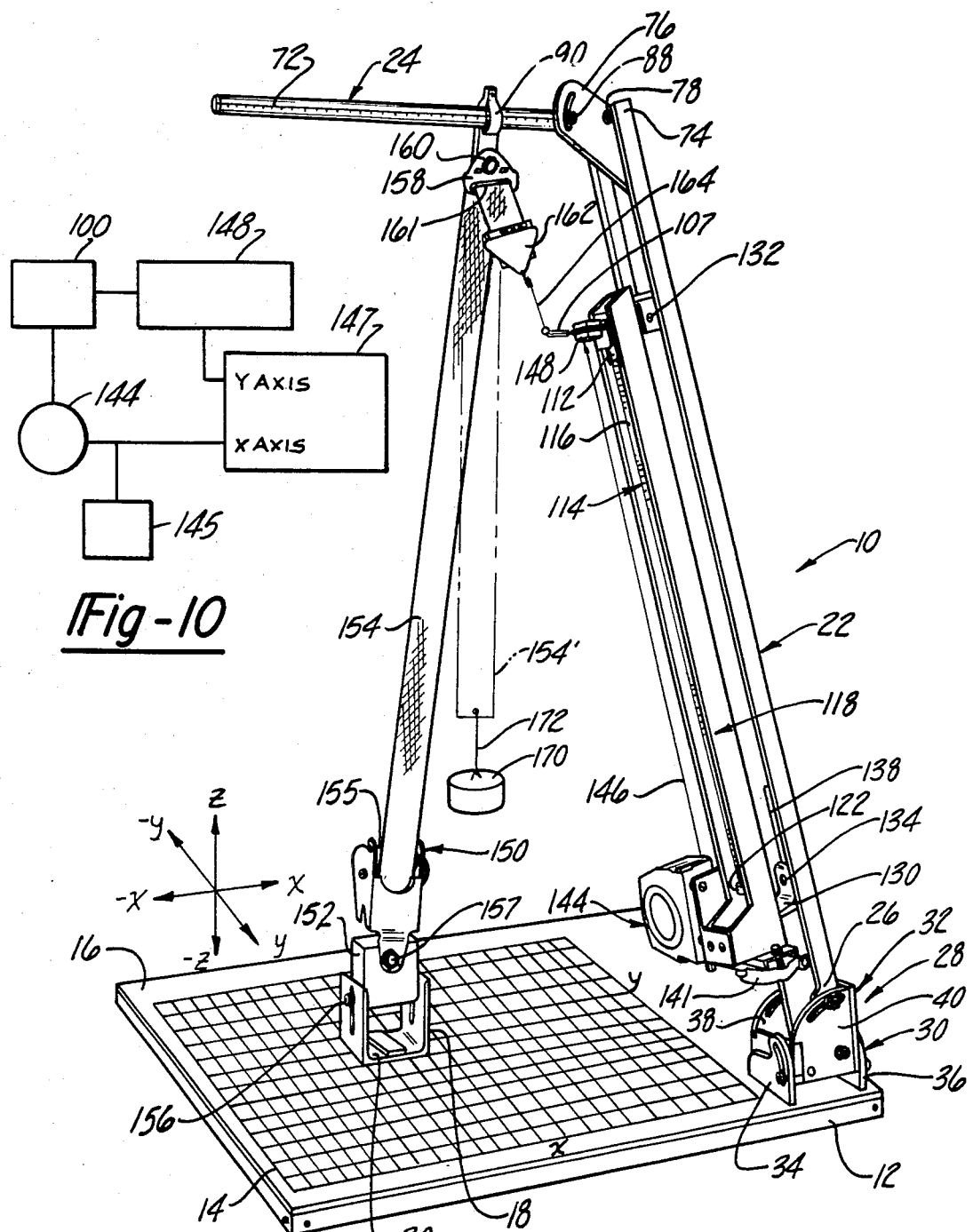
FIG. 1 is a perspective view showing a seat belt system testing device made in accordance with the present invention.

Referring to the drawings and, more particularly, to FIG. 1 thereof, a seat belt testing device is shown at 10 for use in a simulated laboratory test installation. The device 10 comprises a generally rectangular shaped horizontally disposed support base 12 having an X and Y coordinate system 14 formed or scribed on its upper planar surface 16. A U-shaped seat belt retractor attaching bracket 18 is adapted to be releasably fixed on the surface 16. The bracket is positioned at an infinite number of X and Y coordinate locations by suitable means such as by two-sided adhesive tape securing bracket horizontal bight portion 20 undersurface to the surface 16.

An articulated arm assembly including a primary U-sectioned arm 22 and a secondary arm 24, is shown supported on the base 12. The primary arm 22 has its one end 26 mounted to dual pivot means 28 fixed to the surface 16 adjacent origin indicated at "O" of the X-Y coordinate system. The dual pivot means 28 comprises first and second trunnion journals 30 and 32. The first trunnion journal 30 includes a first pair of side plates 34 and 36 fixed to the base 12 and extending parallel to the Y-axis of the coordinate system. The second trunnion journal 32 includes a second pair of spaced side plates 38 and 40 each extending parallel to the X-axis with the primary arm 22 positioned in its vertical orientation as shown in FIGS. 4 and 5.

FIG. 3 shows the side plates 38 and 40 opposed edges secured together, as by a plurality of fasteners, to a pair of parallel cross-plates 42 and 44. The side plates 34 and 36 and cross-plates 42,44 have aligned apertures to receive a first pivot pin 46 therethrough allowing the primary arm 22 to pivot parallel to the Y-axis. A pair of aligned apertures in the cross-plates are aligned with arcuate slots 48 and 50 in side plates 34 and 36 respectively. The arcuate slots 48 and 50 have their axis of curvature coincident with the axis of the first pivot pin 46. A first positioning pin 52 extends through the arcuate slots 48 and 50 and its associated cross-plate apertures enabling the primary arm 22 to be positioned at a plurality of Y-axis angular inclinations relative to the base 12. The side plate 34 has an arcuate edge 54 formed with its axis of curvature coincident with the axis of first pivot pin 46. The edge 54 has a graduated scale 55 which reads degrees of angular inclination for alignment with a Y-axis reference mark 56 on cross plate 42 and side plate 40.

In a similar manner the second pair of side plates 38 and 40 together with primary arm parallel side walls 58 have aligned apertures to receive a second pivot pin 60 therethrough allowing the primary arm 22 to pivot in a plane parallel to the X-axis with the primary arm positioned in its vertical orientation as shown in FIGS. 5 and 6. A pair of aligned apertures in the side walls 58 are aligned with arcuate slots 62 and 64 in the side plates 38 and 40, respectively. The arcuate slots 62 and 64 have their axis of curvature coincident with the axis of the second pivot pin 60. A second positioning pin 66 extends through the arcuate slots 62 and 64 and its associated side wall 58 apertures enabling the primary arm 22 to be positioned at a plurality of X-axis angular inclinations relative to the base coordinate system 14. In a like manner the side plate 40 has an arcuate edge 68 formed with its axis of curvature coincident with the axis of second pivot pin 60. The edge 68 has a graduated scale 69 indicating degrees of angular inclination for alignment with an angular X-axis reference mark 70 on the arm adjacent side wall 58.

The secondary arm 24, as shown in FIGS. 1 and 2, comprises a circular-sectioned rod 72 projecting from upper end 74 of the primary arm 22 by means of a supporting gauge plate 76. The gauge plate 76 is fixedly secured to the primary arm 22, as by a plurality of fasteners 77 (FIG. 5), and has a third pivot pin or bolt 78 extending through aligned apertures in the gauge plate 76 and a flat face 79 machined on the inner end of rod 72.

The axis of the third pivot pin 78 is aligned in an orthogonal manner with the principal axis of the primary arm 22. The gauge plate 76 has an arcuate slot 80 having its axis of curvature coincident with the axis of the third pivot pin 78. An arcuate edge 82 of the gauge plate 76 has a graduated scale 84 indicating degrees of angular inclination for alignment with a zero line 86 on flat face 79 as shown in FIG. 5. A graduated linear scale 91 is provided on the rod 72. A third positioning pin 88 extends through the arcuate slot 80 and an aligned aperture in the rod flat face 79 enabling the rod to be positioned at a plurality of angular settings from its zero index line 86. In this way the rod 72 can be disposed at predetermined orientations such as parallel to the X-axis of the coordinate system throughout the various positions of the primary arm 22.

A turning-loop rotator clamp 90 is adapted to be slidably and pivotally positioned on the rod 72 along the graduated linear scale 91. As seen in FIGS. 2 and 4 the rotator clamp 90 has an upper clamp portion defining bifurcated fingers 92 and 94 having aligned threaded bores threadedly receiving a clamping fastener 96. The clamp 90 thus may be be retained in any bi-directional rotational position about the axis of the rod 72 as well as any rectilinear setting along the rod 72.

A force transducer or load cell arrangement, generally indicated at 100 in FIGS. 5, 6 and 9, is adapted to precisely measure small extraction and retraction forces characteristic of an optimized seat belt system. The load cell arrangement 100 comprises four electrical resistance strain gauges 101–104 mounted in pairs on the top 105 and bottom 106 surfaces of an outwardly extending cantilevered beam 107 formed of spring or tool steel having predetermined dimensions. In the disclosed form the strain gauges 101–104 are of a type commercially available from Micro Measurement Company under their stock No. EA-06-031CF-120-LE and have a resistance rating of 120 ohms. As best seen in FIG. 6 the beam 107 is fixedly supported between a pair of upper and lower L-shaped angle braces 108 and 109, respectively. The angle braces 108 and 109 are mounted to a trolley or truck member 110 supported on the upper end of a linear motion ball bushing portion 112 of traveler means in the form of a power drive mechanism, generally indicated at 114 in FIG. 1.

The power drive mechanism 114 comprises a linear actuator screw 116 extending longitudinally within a U-sectioned track member 118. Rotation of the screw 116 causes the ball bushing 112 and truck 110 to move linearly along the screw. A pair of upper and lower screw mounts 120 (FIG. 6) and 122 (FIG. 1) are secured to base wall portion 124 of the track member 118 by suitable fasteners 126. As seen in FIGS. 4 and 5 the track member 118 is positioned in parallel relationship with the primary arm 22. The track member 118 extends from the primary arm's one end 26, adjacent pivot means 28, to a location adjacent the primary arm's free end 74.

The track member 118 is supported on the primary arm by means of a pair of top and bottom L-shaped angle members 128 and 130, respectively, bolted to primary arm base wall portion 124 at 132 and 134. It will be noted in FIGS. 1 and 4 that longitudinal slots 136 and 138 are formed on the track base wall portion 124 for receiving the bolts 132 and 134 thus allowing longitudinal adjustment of the track member 118 relative to the primary arm 22. The source of motive power for the drive mechanism 114 is a reversible electric motor 140 suitably attached to by bracket means the primary arm. The motor 140 rotates the screw 116 by means of a drive gear reduction box 141 to raise or lower the truck member 110 between an upper zero graduation mark 142 and a lower mark 143 defining the end points of a 600 mm. linear scale.

A rotary deflection or displacement transducer assembly 144 has a reel mounted extendable and retractable cable 146 with its free end connected to block portion 148 of truck member 110. It will be noted that the rotary deflection transducer 144 of the present invention is a state-of-the-art design and may be purchased under the trade name Displacement Transducer 30, Model 4040 manufactured by Research Incorporated (RI) Minneapolis, Minn.

The rotary deflection transducer 144 contains a potentiometer (or variable resistor, not shown) that requires a D.C. power supply shown at 145 in the schematic block diagram of FIG. 10. As the cable 146 is extended or retracted a proportional change in output voltage is produced which is amplified and scaled externally by an amplifier in the X-axis of an X-Y plotter indicated at 147 in FIG. 10. The X-Y plotter of the present invention is of a conventional design and may be purchased under the designation Model No. 7046B from the Hewlett-Packard Company. As an example of a two-inch change of displacement of the cable 146 moves the plotter X-axis one inch, or a scale factor of two inches/inch.

The strain gages 101–104 form the four legs of a full bridge circuit, shown schematically at 100 in FIG. 9, which measures vertical bending movements or deflection of beam 107. Under no force or motion, the bridge circuit is balanced to a zero voltage output by an external bridge type amplifier 148. The output of the bridge amplifier is connected to the Y axis of the X-Y plotter. As the beam 107 is deflected upwardly under load the resistance of the strain gages 103 and 104 increases while the resistance of the strain gages 101 and 102 decreases, causing a proportional change in the voltage drop across the strain gage bridge transducer 100. This change is amplified and scaled along the Y axis of the X-Y plotter 147. In a typical example a two-ounce force equals one-inch of deflection on the X-Y plotter. The strain gage bridge, bridge amplifier and X-Y plotter are initially calibrated as a system before each test using calibration weights. It will be noted that the four strain gage bridge provides temperature compensation and increased bending movement sensitivity.

The operation of the seat belt test device will first be described in its seat belt assembly extraction/retraction force measurement mode. A seat belt retractor assembly 150 is shown in FIG. 1 anchored to a retractor bracket block 152 with the seat belt webbing 154 fully wound on retractor spool 155. The bracket block 152, fixed to bracket 18, is positioned on the coordinate system grid 14 as required by a proposed vehicle design installation. It will be noted that the block 152 may be vertically adjusted by bolt 156 and the retractor angularly adjusted about its pivot bolt 157 to a predetermined position as required by the proposed vehicle installation. A turning loop 158 is anchored to the turning loop rotator clamp 90 by tightening bolt 160 upon the clamp being axially and rotatably adjusted and clamped on the secondary arm rod 72 at an orientation dictated by the vehicle geometry.

The seat belt webbing 154 is next extracted from the retractor spool 155 and threaded through slot 161 of the turning loop 158. The webbing free end has a latch plate simulator 162 secured thereto. The latch plate simulator 162 is connected by a wire hook and eye arrangement 164 to the free end of the force transducer steel cantilevered beam 107. As discussed above the beam 107 is fixed to the elevator truck member 110, which is raised and lowered by the motor driven power screw mechanism. The rotary displacement transducer cable 146 is suitably secured to the truck member 110 by means of a laterally extending support member 166 (FIG. 4).

As seen in FIG. 1 the turning loop 158 is fixed at a predetermined position corresponding to a proposed vehicle installation geometry by means of the primary arm dual pivot means 28, the graduated rod 72 positioning pin 88, and the rotator clamp 90. With the latch plate simulator 162 in the position shown the testing device simulates a fully stowed seat belt webbing 154 in a vehicle. Extraction force measurements of the belt webbing 154 are taken by energizing the electric motor 140 and moving the truck member 110 along the track 118 toward the base 12 thus duplicating extraction of the webbing 154 from the retractor spool. The resulting deflection of the beam 107 is sensed by the force transducer bridge 100 and transmitted by electrical cable 168, supported by loop 170, to a suitable recorder means (not shown).

The output of the rotary deflection transducer, which is connected by cable 146 to the truck member 110, indicates and records the length of webbing that has been extracted from the spool 155. When the latch plate simulator 162 is in a position adjacent to the turning loop the rotary deflection transducer 144 output is zero. As the truck member 110 is advanced down the track 118 by the power screw mechanism 114, the cable 146 is reeled back into the rotary deflection transducer. This feeding of the cable 146 into the transducer 144 provides a direct linear measurement of the length of webbing 154 extracted from the spool 155. The webbing length signal, which is transmitted as the truck 110 moves down the track 118, is received and recorded simultaneously with the recording of the cantilevered beam face transducer electrical output signal. As a result reading of the webbing extraction in force versus webbing extension is obtained as a direct plot.

To record retraction force versus webbing return is obtained by merely reversing the direction of the motor 140 causing the truck 110 to be moved upwardly in the track 118 and returning the latch plate simulator 162 to its original stowed position of FIG. 1. By means of the primary and secondary arm adjustments described above the various seat belt elements can be accurately repositioned and measurements of extraction/retraction force versus webbing extension/return lengths recorded and compared to obtain the optimum force relationships. Such relationships may then be used to achieve the most advantageous design of a vehicle seat belt installation.

The testing device of the present invention may be used in a second mode to accurately measure the level of frictional resistance of various seat belt turning loop designs. The testing device is as shown and described in the first mode except that the retractor assembly 150, bracket 18 and height block 152 are not used. In this mode a predetermined length of seat belt webbing 154 is threaded through the turning loop webbing slot 161 and attached to the latch plate simulator 162. A predetermined weight 170 is attached to the free end of webbing 154' to provide contrast resistance between the seat belt webbing and the turning loop webbing bearing surface. In the disclosed form a weight of 250 g. is suspended from the webbing by means of line 172.

With the latch plate simulator 162 in a position adjacent the turning loop 158, and the truck 110 in its uppermost initial position, the rotary deflection transducer 144 is again set to read zero. The motor 140 is energized moving the truck 110, force transducer, latch plate simulator, and webbing in a direction that pulls the webbing 154' across the turning loop webbing bearing surface. The test is then repeated using an alternate turning loop design and/or web bearing or contacting material. Thus, all contributions to the strain gauge force reading transducer are constant except for the web bearing surface, for example. This allows ready comparison of various turning loop designs and web bearing surfaces.

A third mode of operation for the testing device involves measuring and comparing the amount of friction that is characteristic of a free running latch plate design and material. The test device is arranged as described for the second mode except that the latch plate simulator 162 acts as a connector link to the motorized truck which simulates the retractor spring action. The turning loop 158 is mounted on the opposite side of the rotation clamp 90, with the front side of the turning loop facing away from the connector link in the form of the latch plate simulator 162. The hanging weight 170 is removed from the webbing and the latch plate is positioned adjacent to the turning loop. The truck-mounted force transducer on beam 107 is operated as described in the second mode.

The resulting force applied to the force transducer 100 simulates the retractor retraction force which is recorded as the truck 110 moves down the track 118. This force includes the force required to pull the webbing through the latch plate, the force required to pull the webbing across the webbing bearing surface of the turning loop, and the weight of the webbing. Next the free running latch plate friction test is repeated with different latch plate design and/or materials. Thus, all contributions to the force reading are constant except for those due to the selected design and/or material characteristics of the latch plate. In this manner, various latch plate designs can be readily compared.

It will be appreciated that with the disclosed device the settings of the primary arm dual pivot means 28, secondary arm adjustment pin 88 and clamp 90, and the actual vehicle installation coordinate must be matched only initially. Thereafter, proper recording of the various settings will allow easy and repeatable simulation of the actual in-vehicle application. For example, when the seat belt assembly is mounted in the test device, the motorized truck 110 carrying load transducer beam 107 extracts the seat belt webbing 154 from its stowed position on the retractor 150, and provides measurements of the forces required to perform this action. The disclosed test device will extract 600 mm (23.6 in.) of webbing for each full travel of the track 118. A measured recording of the complete webbing extraction is obtained by temporarily disconnecting the latch plate simulator 162, returning the displacement transducer 144 to its starting location, reconnecting the latch plate simulator, and repeating the run. It is important to inhibit retractor spring rewind in this interim period to obtain a true trace on the X-Y plotter of one complete belt webbing extraction.

Applicants' test device thus allow various changes in seat belt system components to be objectively measured so as to determine the optimum installation geometries of assemblies with variable components. In addition, the test device is operative to determine components' design that minimize their contribution to system friction. Thus, by combining optimized assembly installation and optimized component design, the device allows the extraction and retraction forces to be balanced thereby achieving a functional, convenient and comfortable seat belt system.

While only one embodiment of the inventive seat belt testing apparatus has been described, others are possible without departing from the scope of the appended claims.

What is claimed is:

1. A three-dimensional seat belt testing apparatus comprising;
   a horizontally disposed support base having X and Y axes intersecting at an origin with a vertically disposed Z-axis of an X, Y and Z coordinate system;
   a seat belt retractor anchor bracket adapted to be selectively positioned on said base coordinate system relative to said origin;
   means for pivotally securing a seat belt retractor to said anchor bracket;
   an articulated arm assembly comprising a primary arm and a secondary arm;
   said primary arm having upper and lower ends, said primary arm lower end mounted by dual pivot means on said base adjacent said origin for adjustable movement in both a first plane defined by said X and Z axes and a second plane defined by said Y and Z axes;
   said secondary arm pivotally mounted on the upper end of said primary arm for adjustable movement in a plurality of positions so as to be maintained parallel to said x-axis;
   means for adjustably positioning a seat belt turning loop on said secondary arm permitting graduated angular and longitudinal positioning of said turning loop relative to the axis defined by said secondary arm;
   elevator means on said primary arm for raising and lowering truck means along an axis parallel to said primary arm;
   a flexible cantilevered beam having a fixed end and a free end, said fixed end secured to said truck means for movement therewith;
   said retractor including a spool mounted roll of seat belt webbing mounted on a spring biased reel, said roll of webbing adapted to be extracted from said reel with its free end threaded through said turning loop;
   rotary deflection transducer means mounted adjacent said primary arm lower end, said rotary deflection transducer means including a cable adapted to be reeled from said transducer means, said cable having its free end attached to said truck means, whereby said rotary deflection transducer measures the linear travel of said truck means;
   means securing the free end of said cantilevered beam to latch plate simulator means attached to said belt webbing free end, and
   force transducer means mounted on said beam adjacent to its free end for measuring the maximum bending movement applied to said beam upon said elevator means moving said truck means from an initial predetermined position adjacent said primary arm upper end to a second position adjacent said primary arm lower end, whereby the force required to extract said belt webbing from said retractor means may be directly measured and correlated relative to the linear travel recorded by said rotary deflection transducer means for a plurality of relative spacial locations occupied by said retractor means and said turning loop.

2. The three-dimensional seat belt testing apparatus as set forth in claim 1, wherein said force transducer means mounted on said cantilevered beam is in the form of a full bridge electrical circuit having four strain gages forming the four legs of said bridge circuit adapted for measuring vertical deflection of said beam.

3. The three-dimensional seat belt testing apparatus as set forth in claim 2, wherein said rotary deflection transducer includes potentiometer means operative such that as said cable is extended or retracted a proportional change in output voltage is produced which is amplified and scaled along the X-axis of an X-Y plotter.

4. The three-dimensional seat belt testing apparatus as set forth in claim 3, wherein as said beam is deflected upwardly under load the resistance of the first two of said strain gages increases while the resistance of the second two of said strain gages decreases causing a proportional change in the voltage across said strain gage bridge, and wherein said change is amplified and scaled along the Y-axis of said X-Y plotter.

* * * * *